US007797424B2

(12) United States Patent
Ogawa

(10) Patent No.: US 7,797,424 B2
(45) Date of Patent: Sep. 14, 2010

(54) METHOD AND APPARATUS FOR JUDGING COINCIDENCE OF ADDRESSES, AND SERVICE PROVISION METHOD AND SERVICE PROVISION APPARATUS

(75) Inventor: Katsuhisa Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1242 days.

(21) Appl. No.: 10/677,968

(22) Filed: Oct. 1, 2003

(65) Prior Publication Data

US 2004/0068566 A1 Apr. 8, 2004

(30) Foreign Application Priority Data

Oct. 2, 2002 (JP) ............................. 2002-290215

(51) Int. Cl.
*G06F 15/173* (2006.01)
*H04L 12/66* (2006.01)
(52) U.S. Cl. ........................ 709/226; 709/238; 370/352
(58) Field of Classification Search ................. 709/226, 709/245
See application file for complete search history.

(56) References Cited

U.S. PATENT DOCUMENTS 5,999,536 A * 12/1999 Kawafuji et al. ............ 370/401
6,065,064 A * 5/2000 Satoh et al. ................. 709/249
6,237,023 B1 5/2001 Yoshimoto
6,625,662 B1 * 9/2003 Satoh et al. ................. 709/250
6,959,009 B2 * 10/2005 Asokan et al. .............. 370/475
7,197,579 B2 * 3/2007 Saito et al. .................... 710/15
7,272,140 B2 * 9/2007 Okamoto .................... 370/392
7,376,123 B2 * 5/2008 Reuss ......................... 370/352
2002/0073329 A1 * 6/2002 Brombal ..................... 713/200
2003/0026241 A1 * 2/2003 Ono et al. ................... 370/349
2003/0037012 A1 * 2/2003 Mersky et al. ................ 705/75
2003/0061380 A1 * 3/2003 Saito et al. .................. 709/238
2004/0184467 A1 * 9/2004 Watanabe .................... 370/401
2006/0020525 A1 * 1/2006 Borelli et al. ................. 705/34
2006/0056420 A1 * 3/2006 Okuda et al. ........... 370/395.54

* cited by examiner

*Primary Examiner*—William C Vaughn, Jr.
*Assistant Examiner*—Joiya M Cloud
(74) *Attorney, Agent, or Firm*—Cowan, Liebowitz & Latman, P.C.

(57) ABSTRACT

A terminal service management server compares a host address of a terminal apparatus received from a terminal manufacturing factory site, a network address acquired from a network address retrieval site and an Internet service provider, and a sender address of a packet sent by a terminal apparatus connected to a LAN, and provides a service to the terminal apparatus connected to the LAN in the case in which the host address, the network address, and the sender address coincide with each other.

4 Claims, 12 Drawing Sheets

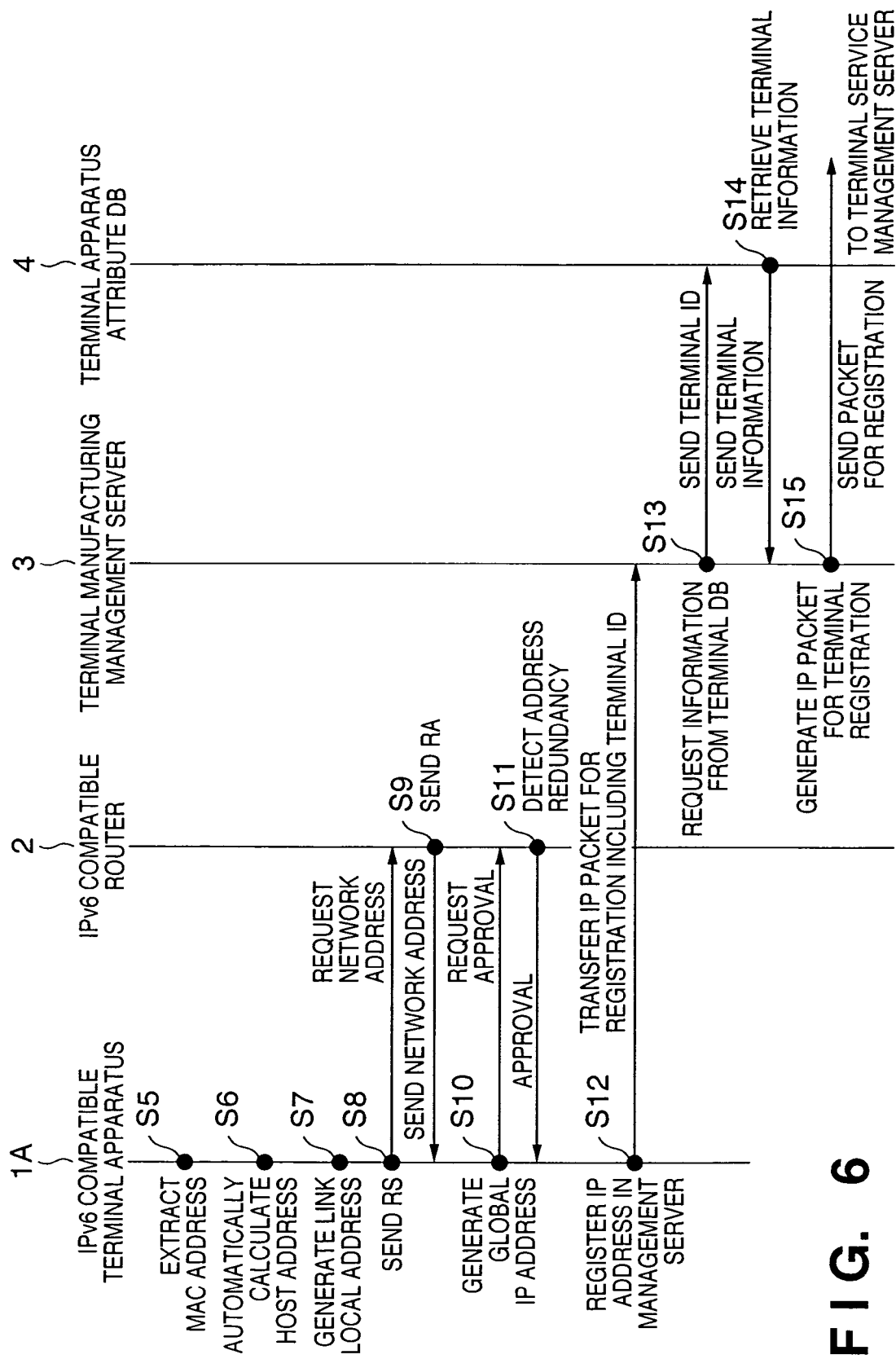
F I G. 6

| TERMINAL ID | HOST ADDRESS | TYPE | MODEL | DATE OF MANUFACTURE | INITIAL SETTING PARAMETER | VALID SERVICE LIST |
|---|---|---|---|---|---|---|
| 100 | 101 | 102 | 103 | 104 | 105 | 106 |
| A1 | 5678:9abc:def0:7777 | PRINTER 1 | BHA | H13.09.13 | PA1 | AS1 |
| B3 | ab94:0000:8a10:aaaa | COMBINATION APPARATUS 1 | iRC | H13.10.07 | PA2 | AS3 |
| C5 | 8a5b:9cc9:1100:0d7f | CAMERA 1 | DGC | H12.12.07 | PA100 | AS9 |

107 ⋯ TERMINAL APPARATUS ATTRIBUTE INFORMATION

FIG. 9

| | |
|---|---|
| SALES TERMINAL NAME | ~108 |
| TERMINAL APPARATUS ID | ~109 |
| NAME OF CUSTOMER'S COMPANY/ORGANIZATION | ~110 |
| NAME OF CUSTOMER'S ISP | ~111 |
| CUSTOMER ADDRESS | ~112 |
| Email ADDRESS | ~113 |
| DOMAIN NAME OF SETTING PLACE | ~114 |
| DATE AND TIME OF SALES | ~115 |
| LICENSED SERVICE | ~116 |
| LICENSED APPLICATION | ~117 |

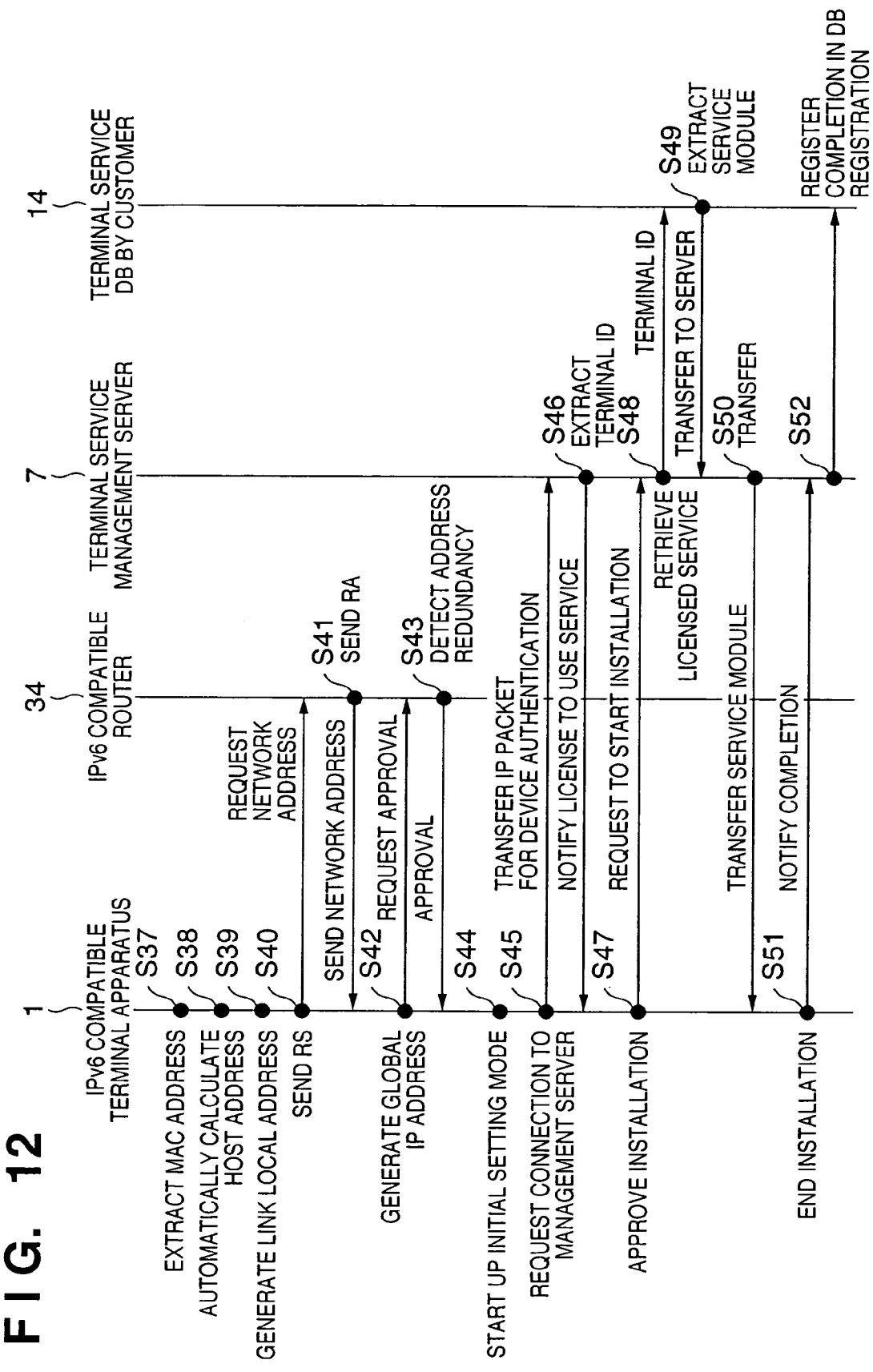

METHOD AND APPARATUS FOR JUDGING COINCIDENCE OF ADDRESSES, AND SERVICE PROVISION METHOD AND SERVICE PROVISION APPARATUS

FIELD OF THE INVENTION

The present invention relates to a method and an apparatus for judging coincidence of addresses, and a service provision method and a service provision apparatus.

BACKGROUND OF THE INVENTION

In recent years, a terminal apparatus accesses a server via an Internet to browse contents on the server via browser software or to download software on the server.

However, in the case in which a connection request is sent from the terminal apparatus to the server, processing such as authentication of an access to the server and licensing of a service to be provided is realized by an application implemented in a client terminal negotiating with the server at an application protocol level. Therefore, the application implemented in the terminal apparatus becomes complicated, and in particular, for the terminal apparatus operating as a thin client, load of the application is very heavy.

In addition, for addition of a service or an application after purchasing a terminal apparatus, a customer who has purchased the terminal apparatus has to download or install the service or the application using an application of the terminal apparatus. This is a complicated operation for a customer who is not accustomed to installation, and an update of the application of the terminal apparatus is difficult.

SUMMARY OF THE INVENTION

It is an object of the present invention to provide simple authentication processing.

In addition, it is another object of the present invention to provide a service without causing a customer to perform complicated installation processing of an application service.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a protocol diagram of a registration procedure of a host address section from the terminal manufacturing factory site 5;

FIG. 9 is a diagram of a terminal sales achievement table by customer;

FIG. 12 is a protocol diagram of procedures for terminal use registration from a customer site and service provision.

DETAILED DESCRIPTION OF THE PREFERRED EMBODIMENTS

Embodiments of the present invention will be hereinafter described in detail with reference to the accompanying drawings.

Figure 1:
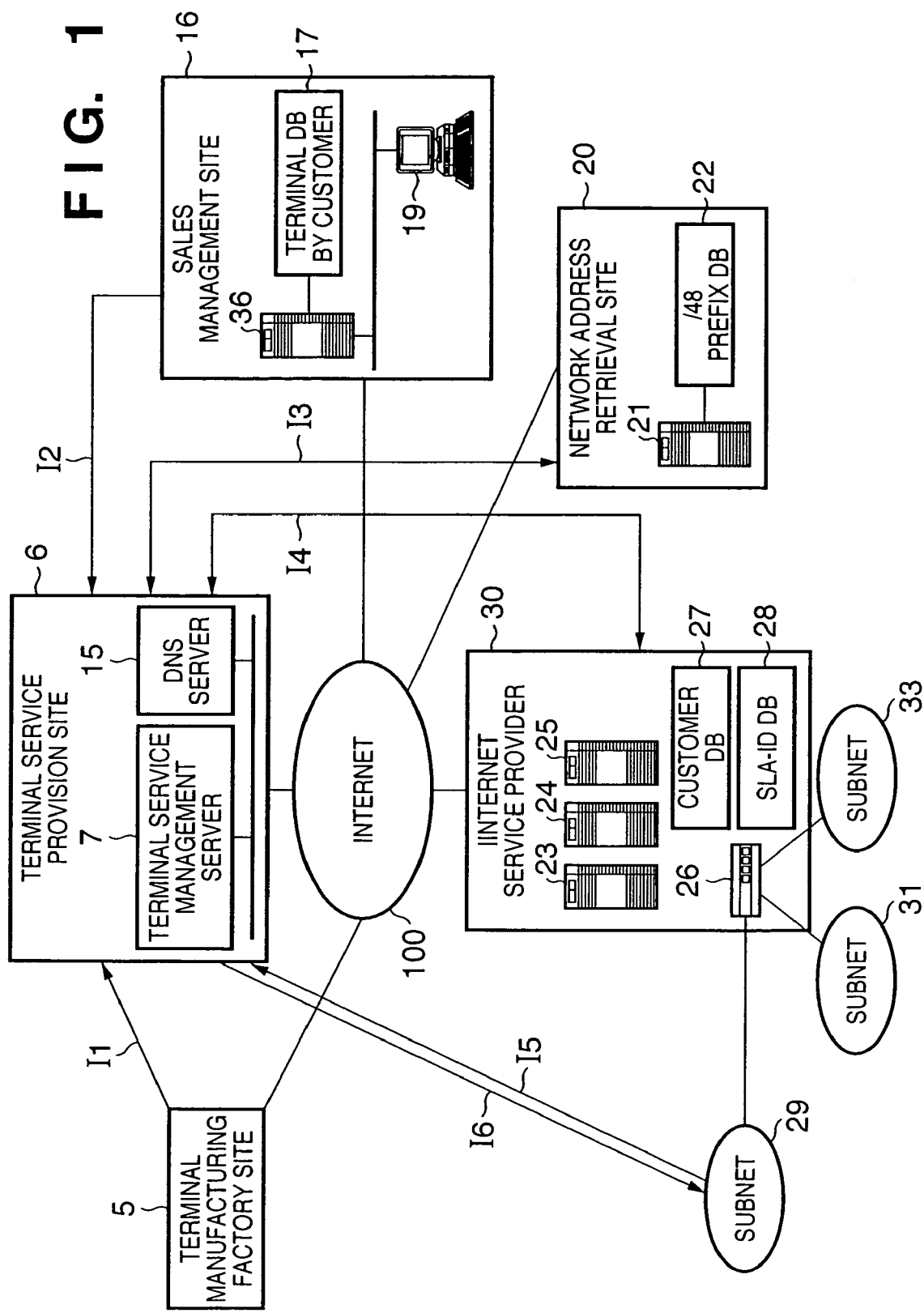
FIG. 1 is an overall system diagram in an embodiment of the present invention.

FIG. 1 is an overall system diagram in an embodiment of the present invention.

In FIG. 1, reference numeral 5 denotes a terminal manufacturing factory site; 6, a terminal service provision site; 16, a sales management site; 20, a network address retrieval site; 30, an Internet service provider (ISP); 29, 31, and 33, LANs; and 100, the Internet.

In the terminal service provision site 6, reference numeral 7 denotes a terminal service management server, and 15 denotes a DNS server.

In the sales management site 16, reference numeral 17 denotes a terminal database by customer; 19, a client terminal; and 36, a terminal sales management server. The client terminal 19 and the terminal sales management server 36 have a structure of a well-known computer.

In the network address retrieval site 20, reference numeral 21 denotes an NWA (network address) retrieval server, and 22 denotes a "/48 prefix" database. The NWA retrieval server 21 has a structure of a well-known computer.

In addition, the ISP 30 is a site which provides a service for connecting an IPv6 compatible terminal apparatus 1 to the Internet 100. Reference numeral 23 denotes a mail server, which is a server managing transmission and reception of Emails which can be used on the Internet to and from users using the ISP 30. Reference numeral 24 denotes a DNS server, which, in response to an Internet connection request with a domain name from a customer, performs name resolution for retrieving an IP address from the domain name. Reference numeral 25 denotes a gateway server, which has a function of managing and monitoring connection of the ISP 30 and the Internet 100. Reference numeral 26 denotes a router, which has a routing function of, in response to a request from a terminal of a customer connected to a network, transferring an IP packet to a destination.

Networks (sub-networks) for a plurality of customers are connected to the router 26, respectively. The customers form small-sized sub-networks such as the LANs 29, 31, and 33, respectively. For example, an IP packet sent from the IPv6 compatible terminal apparatus 1 connected to this subnetwork (LAN 29) is transferred to the router 26, and sent to the Internet 100 from the gateway server 25.

Reference numeral 27 denotes a customer database, and 28 denotes an SLA-ID database.

Figure 2:
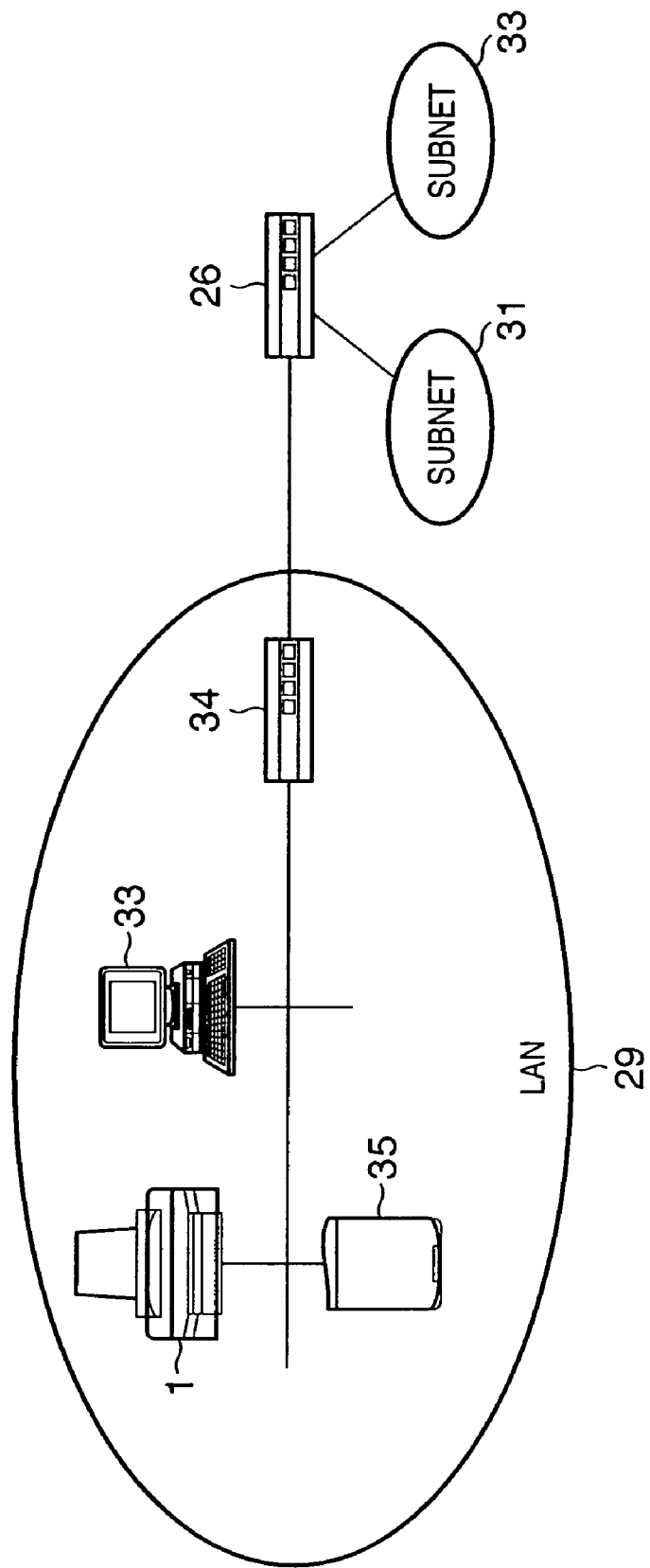
FIG. 2 is a diagram of a LAN 29.

FIG. 2 is a diagram showing details of the LAN 29 of FIG. 1.

In the LAN 29 shown in FIG. 2, reference numerals 1, 33, and 35 denote IPv6 (Internet Protocol Version 6) compatible terminal apparatuses, and 34 denotes an IPv6 compatible router. The IPv6 compatible router 34 is connected to the IPv6 compatible router 26 in the Internet service provider (ISP) 30.

Note that the LANs 31 and 33 are also connected to the IPv6 compatible router 26 in the Internet service provider 30 in the same manner as the LAN 29.

Figure 3:
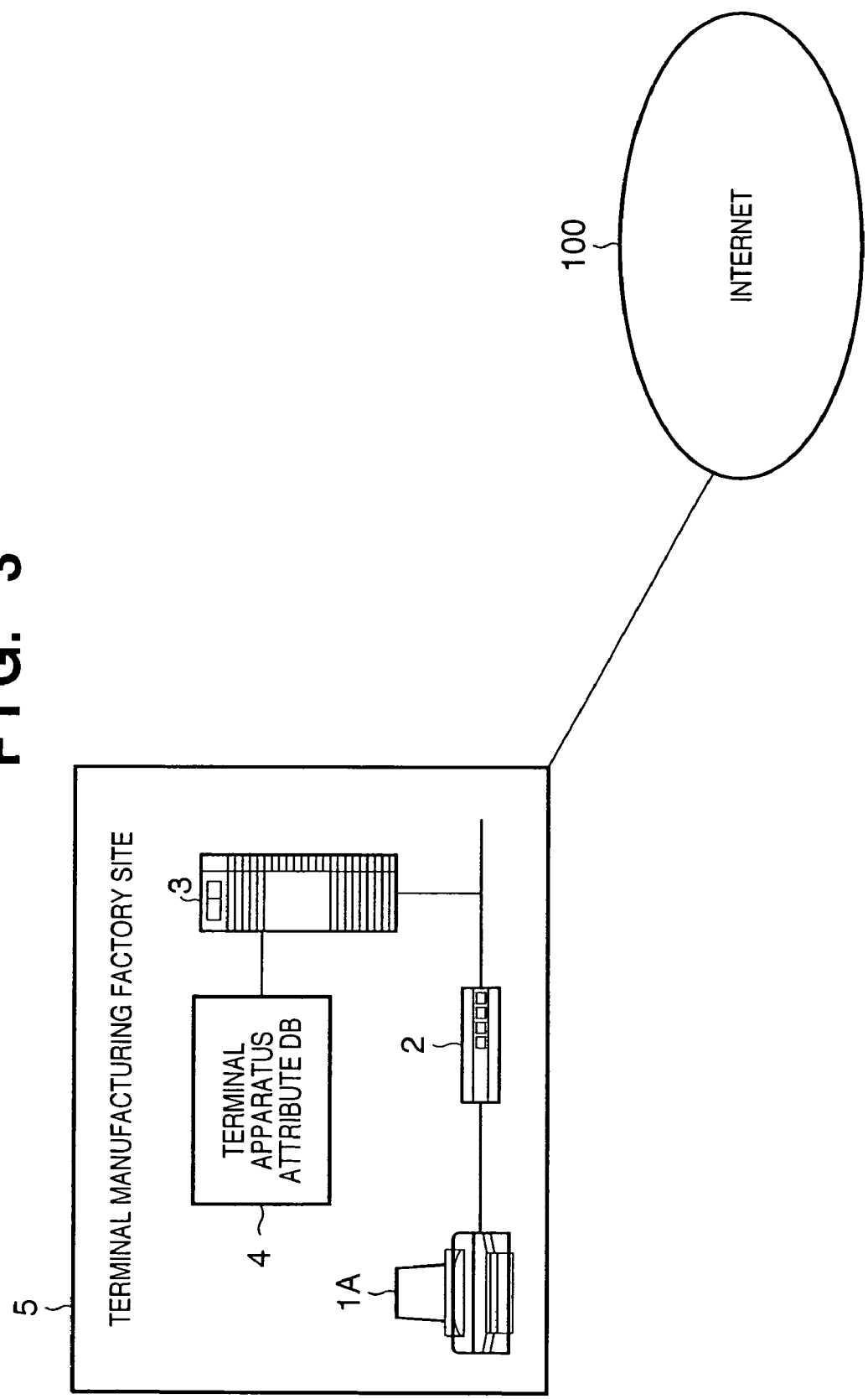
FIG. 3 is a diagram of a terminal manufacturing factory site 5.

FIG. 3 is a diagram showing details of the terminal manufacturing factory site 5 of FIG. 1.

In the terminal manufacturing factory site 5 shown in FIG. 3, reference character 1A denotes an IPv6 compatible terminal apparatus; 2, an IPv6 compatible router; 3, a terminal manufacturing management server; and 4, a terminal apparatus attribute database. The terminal manufacturing factory site 5 is connected to the Internet 100 via the router 2. The terminal manufacturing management server 3 is constituted by a well-known computer and is connected to the terminal apparatus attribute database 4. The terminal manufacturing management server 3 (and the terminal apparatus attribute database 4) may be connected to the IPv6 compatible terminal apparatus 1A side of the IPv6 compatible router 2.

The IPv6 compatible terminal apparatus 1A sends an IP packet for registration including a terminal apparatus ID and a network address of the IPv6 compatible terminal apparatus 1A. This IP packet for registration is received by the terminal service provision site 6 via the router 2 and the terminal manufacturing management server 3 (11 of FIG. 1). An IPv6 host address of the IPv6 compatible terminal apparatus 1A is included in the network address of the IPv6 compatible terminal apparatus 1A. The IPv6 compatible terminal apparatus 1A is programmed to send this IP packet for registration in a registration process in the terminal manufacturing factory site 5. A well-known technique registering data in a server via the Internet is used for this registration.

Note that the IPv6 compatible terminal apparatus 1A manufactured in the terminal manufacturing factory site 5 of FIG. 3 is connected to the LAN 29 of FIG. 2 as the IPv6 compatible terminal apparatus 1 shown in FIG. 2 after shipment.

The client terminal 19 of the sales management site 16 registers information on a user of the LAN 29 (a name of user's organization/company) or the like in the terminal service management server 7 via the terminal sales server 36 (I2 of FIG. 1). A well-known technique registering data in a server via the Internet is used for this registration.

The terminal service management server 7 acquires higher-order 48 bits of the network address of the LAN 29 from the DNS server 15 or the network address retrieval site 20 based upon the information (domain name, ISP name, name of user's organization/company) registered from the client terminal 19 (I3 of FIG. 1). A well-known technique for acquiring data from a database via the Internet is used for this acquisition.

The terminal service management server 7 acquires lower-order 16 bits (sub-network address) of the network address of the LAN 29, to which the IPv6 compatible terminal apparatus 1 is connected, from the customer database 27 and the SLA-ID database 28 of the Internet service provider 30 based upon the information on the user of the LAN 29 (I4 of FIG. 1).

As described above, the terminal service provision site 6 acquires the host address of the IPv6 compatible terminal apparatus 1A and the network address of the LAN 20. Then, in the case in which the terminal service provision site 6 has received a packet from the IPv6 compatible terminal apparatus 1 connected to the LAN 29 (I5 of FIG. 1), the terminal service provision site 6 judges whether or not a host address and a network address of a sender address of the packet coincide with the host address of the IPv6 compatible terminal apparatus 1A and the network address of the LAN 29. If the host addresses and the network addresses coincide with each other, as a result of the judgment, the terminal service provision site 6 provides the IPv6 compatible terminal apparatus 1 connected to the LAN 29 of a predetermined application (I6 of FIG. 1).

Figure 4:
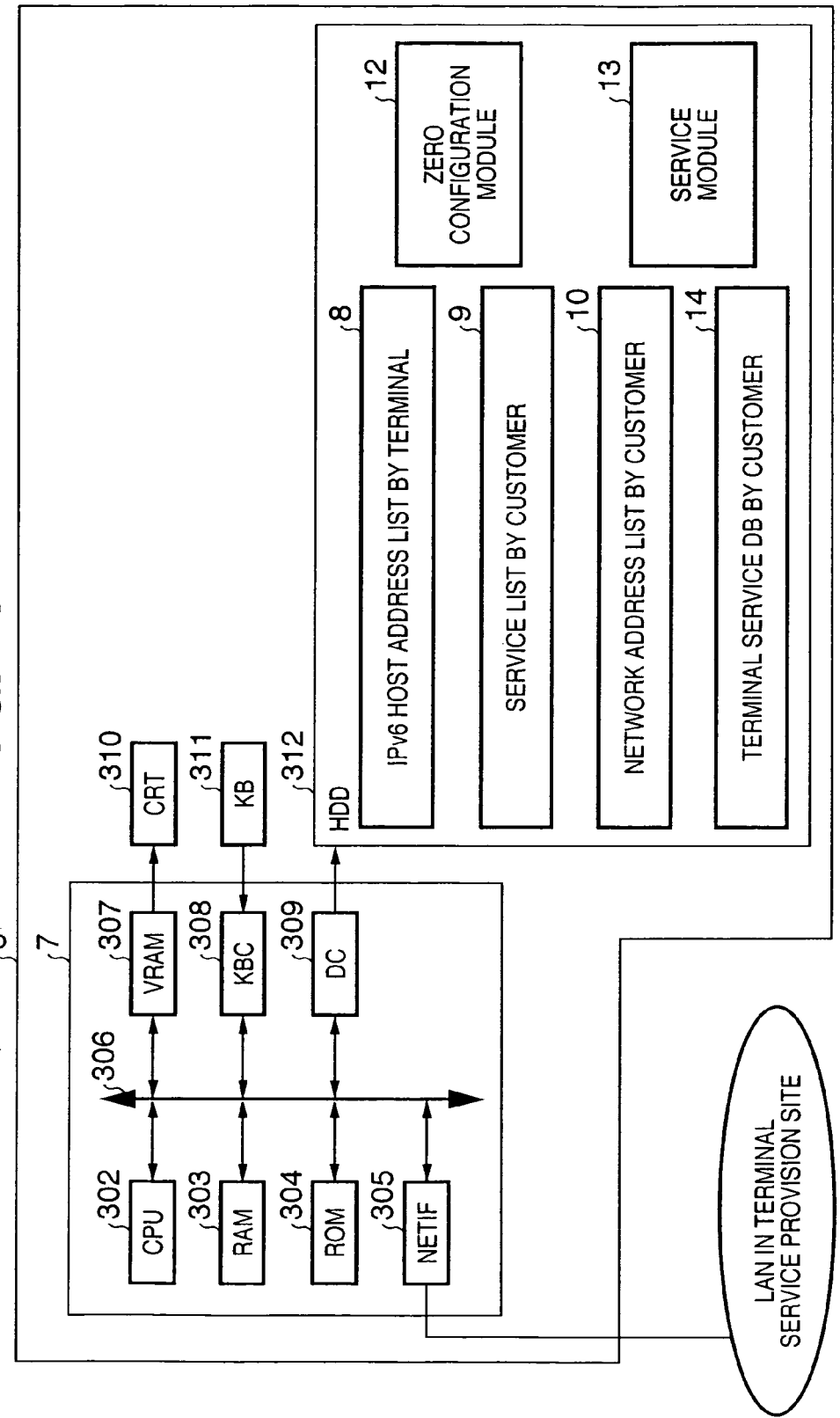
FIG. 4 is a diagram of a terminal service provision site 6.

FIG. 4 is a diagram of the terminal service provision site 6 shown in FIG. 1.

As described below, the terminal service management server 7 has a structure of a well-known computer.

In FIG. 4, reference numeral 302 denotes a CPU controlling the entire terminal service management server 7, which provides various functions by executing arithmetic operation processing based upon a control program stored in a ROM 304. That is, as described below, the CPU 302 performs authentication of the IPv6 compatible terminal apparatus 1 and provision of a service to the IPv6 compatible terminal apparatus 1 based upon the control program stored in the ROM 304.

Reference numeral 306 denotes a common bus line for signals required by each unit in the terminal service management server 7. Reference numeral 303 denotes a RAM, which serves as a main memory for the CPU 302 and functions as a work area or a temporary standby area for an execution program.

Reference numeral 304 denotes a ROM which stores an operation processing procedure of the CPU 302. The ROM 304 has stored therein a system program controlling a function of the terminal service management server 7, a program represented by a processing flow described later, and data necessary for operating a system.

Reference numeral 305 denotes a network interface. The server 7 accesses the Internet 100 via a LAN, which serves as a network inside the terminal service provision site 6, through this interface 305, and executes communication processing such as transfer (transmission and reception) of data (information) to and from the server of each site of FIG. 1.

Reference numeral 307 denotes a video RAM, and 310 denotes a CRT 310. Reference numeral 308 denotes a keyboard controller for controlling an input signal from an external input device 311. Reference numeral 311 denotes an external input device for receiving an operation, for example, a keyboard or a pointing device. Reference numeral 309 denotes a disk controller, which controls a removable disk 312 such as a hard disk or a floppy® disk. This removable disk 312 includes an IPv6 host address list by terminal 8, a service list by customer 9, a network address list by customer 10, a zero configuration module 12, a service module 13, and a terminal service database by customer 14.

Figure 5:
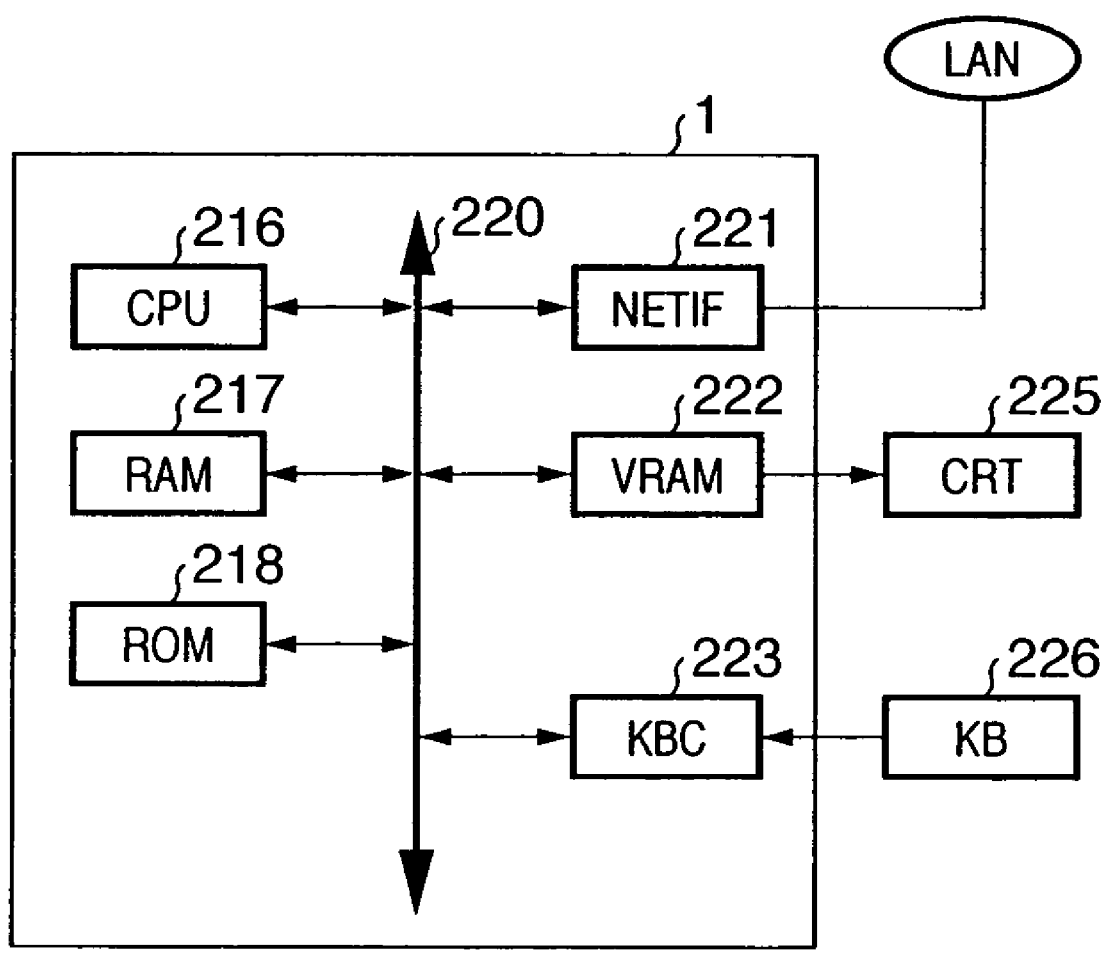
FIG. 5 is a diagram of an IPv6 compatible terminal apparatus 1.

FIG. 5 is a hardware diagram of the IPv6 compatible terminal apparatus 1. Note that the IPv6 compatible terminal apparatus 1 is the IPv6 compatible terminal 1A when it is connected to the terminal manufacturing factory site 5.

In FIG. 5, reference numeral 216 denotes a CPU controlling the entire IPv6 compatible terminal apparatus 1, which provides various functions by executing arithmetic operation processing based upon the control program stored in the ROM 218. Reference numeral 220 denotes a common bus line for signals required by each unit in the IPv6 compatible terminal apparatus 1. Reference numeral 217 denotes a RAM, which serves as a main memory for the CPU 216 and functions as a work area or a temporary standby area for an execution program.

Reference numeral 218 denotes a ROM having stored therein an operation processing procedure of the CPU 216. The ROM 218 has stored therein a system program controlling a function of the IPv6 compatible terminal apparatus 1, a program represented by a processing flow described later, and data necessary for operating a system.

Reference numeral 221 denotes a network interface. The IPv6 compatible terminal apparatus 1 accesses the Internet 100 via an IPv6 compatible router 34 (LAN 29) or an IPv6 compatible router 2 (terminal manufacturing factory site 5) through this interface, and executes communication processing such as data transfer to and from the terminal management service server 7.

Reference numeral 222 denotes a video RAM, and 225 denotes a CRT. Reference numeral 223 denotes a keyboard controller for controlling an input signal from an external input device 226. Reference numeral 226 denotes an external input device for receiving an operation, for example, a keyboard or a pointing device.

[IPv6 Address Architecture]

Next, a constitution of an IP address in an IPv6 protocol will be described.

The IPv6 address has an identification ID constituted by a binary number of 128 bits.

In 128 bits, former 64 bits represent a network address section. The network address is called a prefix. This network address is an address identifying a network to which an IPv6 compatible terminal apparatus is connected. The IPv6 compatible terminal apparatus is notified of the network address by a router (e.g., the router 34 or 2) in a link (a range in which communication is possible in a data link layer) of the network and obtains the address.

In 128 bits, latter 64 bits represent a host address. The host address is also called an interface ID. A terminal apparatus itself automatically generates this host address based upon an MAC address assigned to a network interface processing apparatus (e.g., the network interface 221) provided in the terminal apparatus.

In this embodiment, the host address is used as an identification ID specifying a terminal apparatus.

Next, a constitution of the prefix section serving as a network address will be described.

The prefix section includes an address type identifier FP (3 bits), a TLA (13 bits), a reserved bit RE (8 bits), an NLA (24 bits), and an SLA (16 bits).

In the case in which a value of the address type identifier FP is "001", it indicates an aggregatable IP address (unicast address).

An identification ID of a wide area backbone ISP is set in a TLA (Top-Level Aggregation Identifier). An identification ID of an ISP, which is assigned an address block by an ISP owning the TLA, is set in an NLA (Next-Level Aggregation Identifier).

An SLA (Site-Level Aggregation Identifier) is an area of a subnetwork address, which a site of each organization (user) assigned an address block by a provider having an address of higher-order 48 bits (other than SLA 16 bits) from the FP to the NAL can set freely, and can define 65535 subnetworks equivalent to 16 bits of the SLA.

Various addresses are defined in the IP address defined in the IPv6 protocol according to a range in which the address is valid. A unicast address is a global IP address which is unique in the Internet of IPv6 (only one IP address in the world).

As described above, the network address adopts an address architecture which provides a hierarchical network address, and the unicast address consists of an ISP_ID (including the TLA and the NLA), which begins with the address type identifier FP having a value of "0001" and identifies the ISP, and the SLA indicating the subnetwork address.

In addition, an address, which is valid within a data link layer (this range will be hereinafter referred to as link) managed by a router set in a network, is defined in the IPv6 protocol as a link local address. The link local address sets "1111111010" to top 10 bits of former 64 bits serving as the network address section and "0" to all bits from eleventh to sixty fourth bits. That is, "fe80::" (hexadecimal notation) is set in the network address.

[IPv6 Host Address Automatic Generation Processing from an MAC Address]

Next, a process of generating an IPv6 host address from an MAC address, which is assigned to network interface hardware (e.g., the network interface 221) of a terminal apparatus, will be described.

The MAC address has two types of address formats, namely, the IEEEEUI-64 format and the IEEE802 format. The MAC address of the IEEEEUI-64 format is constituted by an identification ID of 64 bits. Former 24 bits represent a vender ID (company ID) and are assigned to a company manufacturing the network interface hardware so as to be unique. A seventh bit from the top of this vender ID is called a U/L (Universal/Local) bit. In the case in which the bit is used in a local management (LAN environment, etc.), 1 is set to it and, in the case in which the bit is used in a global management (Internet environment, etc.), 0 is set to it. Latter 40 bits represent a board ID. The board ID is a unique ID which identifies a network interface hardware manufactured under the management of the company manufacturing the network interface hardware. The network interface hardware is shipped with the board ID set as an identification ID.

The MAC address of the IEEE802 format consists of an identification ID of 48 bits. Former 24 bits represent a vendor ID, which has the same format as the vendor ID of the IEEEEUI-64 format. Latter 24 bits represent a board ID. A unique identification ID identifying network interface hardware of respective terminal apparatuses is set as the board ID.

Next, IPv6 host address automatic generation processing from the MAC address will be described.

When the IPv6 compatible terminal apparatus 1 is connected to the network, software stored in the IPv6 compatible terminal apparatus 1 judges a format of the MAC address of the network interface 221. In the case in which the MAC address is the EUI-64 format, seventh bit of the vendor ID is reversed, whereby an IPv6 host address is generated. In the case in which the MAC address is the IEEE802 format, the U/L bit (seventh bit from the top) is reversed and an identifier of 16 bits of "fffe" in hexadecimal number is inserted in twenty-fifth bit in the border between the vendor ID and the board ID, whereby an IPv6 host address 41 of total 64 bits is generated.

[Host Address Registration Protocol]

FIG. 6 is a protocol diagram showing a procedure for registering a host address section in the terminal service management site 6 from the terminal manufacturing factory site 5.

The IPv6 protocol compatible terminal apparatus 1 is an apparatus which is capable of using a global IP address of an IPv6 address format as an identification ID on a network to make use of various service on the Internet 100. The IPv6 compatible terminal apparatus 1 is produced in a manufacturing factory of a terminal apparatus manufacturer providing this terminal. Reference character 1A denotes an IPv6 compatible terminal apparatus 1 in the manufacturing factory of the terminal apparatus manufacturer.

The terminal manufacturing factory site 5 shown in FIG. 3 is installed in the manufacturing factory manufacturing the IPv6 compatible terminal apparatus 1A and plays a role of sending and receiving various kinds of information of the IPv6 compatible terminal apparatus 1A in a manufacturing process.

When the IPv6 compatible terminal apparatus 1A is connected to the IPv6 compatible router 2, which is managed by the terminal manufacturing factory site 5 provided in the terminal manufacturing factory, in an IPv6 host address registration step after an assembly step of a manufacture line and a function inspection step end, in S5, the IPv6 compatible terminal apparatus 1A extracts an MAC address allocated to the network interface 221 of itself. In S6, the IPv6 compatible terminal apparatus 1A generates an IPv6 host address identifying the IPv6 compatible terminal apparatus 1A from this MAC address according to flow processing for IPv6 host address automatic generation.

In S7, the IPv6 compatible terminal apparatus 1, for which the host address has been generated, sets "fe80::", which is a network ID indicating a link local address, in the network section to automatically generate the link local address.

In RS (Router Solicitation) transmission of S8, the IPv6 compatible terminal apparatus 1A inquires a network address from the IPv6 compatible router 2 existing in the identical link. The IPv6 compatible router 2 having received this inquiry sends an RA (Router Advertisement) of S9 to the IPv6 compatible terminal apparatus 1A and notifies it of a network address which is an identifier of the network.

According to this notified network address and the host address, which was automatically generated earlier, a global IP address (unicast address) of the IPv6 compatible apparatus 1A is determined in S10 and is notified to the IPv6 compatible router 2. In response to this, in address redundancy detection of S11, the IPv6 compatible router 2 confirms that other IPv6 compatible apparatuses having IPv6 global IP addresses with the identical identification ID do not exist in the same link, and sends an approval notice of a license to the IPv6 compatible terminal apparatus 1A.

The IPv6 compatible terminal apparatus 1A having received the license notice reads out a terminal apparatus ID from the ROM 218, and in S12, stores the terminal apparatus ID in a payload section of an IP packet for registration. Then, the IPv6 compatible terminal apparatus 1A sends the IP packet for registration, in which the terminal apparatus ID is stored in the payload section, the global IP address of the IPv6 compatible terminal apparatus 1A is set in the sender address of the IP header, and the global IP address of the terminal manufacturing management server 3 is set in the sender address, to the terminal manufacturing management server 3, and notifies the terminal manufacturing management server 3 of the terminal apparatus ID and the global IP address. The terminal apparatus ID of the IPv6 compatible terminal apparatus 1A and the global IP address of the terminal manufacturing management server 3 are registered in the ROM 218 in advance. The terminal apparatus ID of the IPv6 compatible terminal apparatus 1A is a serial number of the IPv6 compatible terminal apparatus 1A and is different from the host address (interface ID) of the IPv6 compatible terminal apparatus 1A.

The terminal manufacturing management server 3 having received this IP packet for registration extracts the terminal apparatus ID from the payload section of the IP packet for registration, sends the terminal apparatus ID to the terminal apparatus attribute database 4 in S13, and requests attribute information in a manufacturing stage of the terminal apparatus which has sent the IP packet for registration. In terminal information retrieval of S14, the terminal apparatus attribute database 4 extracts attribute information of the terminal apparatus and sends a reply to the terminal manufacturing management server 3. In a certain embodiment, in accordance with an instruction from the terminal manufacturing management server 3, the terminal apparatus attribute database 4 associates the IPv6 host address of the IPv6 compatible terminal apparatus 1A with the terminal apparatus ID and the terminal attribute information and stores them as a terminal apparatus attribute table.

In S15, the terminal manufacturing management server 3 having received this stores the terminal apparatus ID and the terminal attribute information in the payload section, and sends the IPv6 packet for terminal registration, in which the global IP address of the IPv6 compatible terminal apparatus 1A is set in the sender address of the IP header, to the terminal service management server 7 (I1 of FIG. 1). Note that an address of the terminal service provision site 6 is registered in the terminal manufacturing management server 3 in advance.

The CPU 302 receives the host address of the IPv6 compatible terminal apparatus 1A, which is obtained at the time of manufacturing of the IPv6 compatible terminal apparatus 1A serving as a communication apparatus having a communication function via a network as described above, through the network interface 305, and stores the host address in the IPv6 host address list by terminal 8.

Note that, in another embodiment, the attribute information of the IPv6 compatible terminal apparatus 1A is registered in the ROM 218 of the IPv6 compatible terminal apparatus 1A in advance and, in S12, the IPv6 compatible terminal apparatus 1A sends an IPv6 packet for terminal registration, in which the terminal apparatus ID and the attribute information are stored in the payload section, the global IP address of the IPv6 compatible terminal apparatus 1A is set in the sender address of the IP header, and the global IP address of the terminal service management server 7 is set in the destination address, to the terminal service management server 7. In this embodiment, a global IP address of the terminal service management server 7 is also registered in the ROM 218. Note that, in this embodiment, the terminal apparatus attribute database 4 and S13 and S14 are unnecessary.

The terminal service provision site 6 receives the IPv6 packet for terminal registration in the terminal service management server 7, and extracts the host address from the sender address of the received IPv6 packet for terminal registration and also extracts the terminal apparatus ID and the terminal attribute information from the payload section. The terminal service provision site 6 stores the host address, the terminal apparatus ID, and the terminal attribute information in the IPv6 host address list by terminal 8.

In this way, at a stage before shipment, the IPv6 host address, the terminal ID, and the terminal attribute information of the IPv6 compatible terminal apparatus 1A are notified to and registered in the terminal service provision site 6. At a stage when the registration of the IPv6 host address ends, the IPv6 compatible terminal apparatus 1A is shipped.

Figure 7:
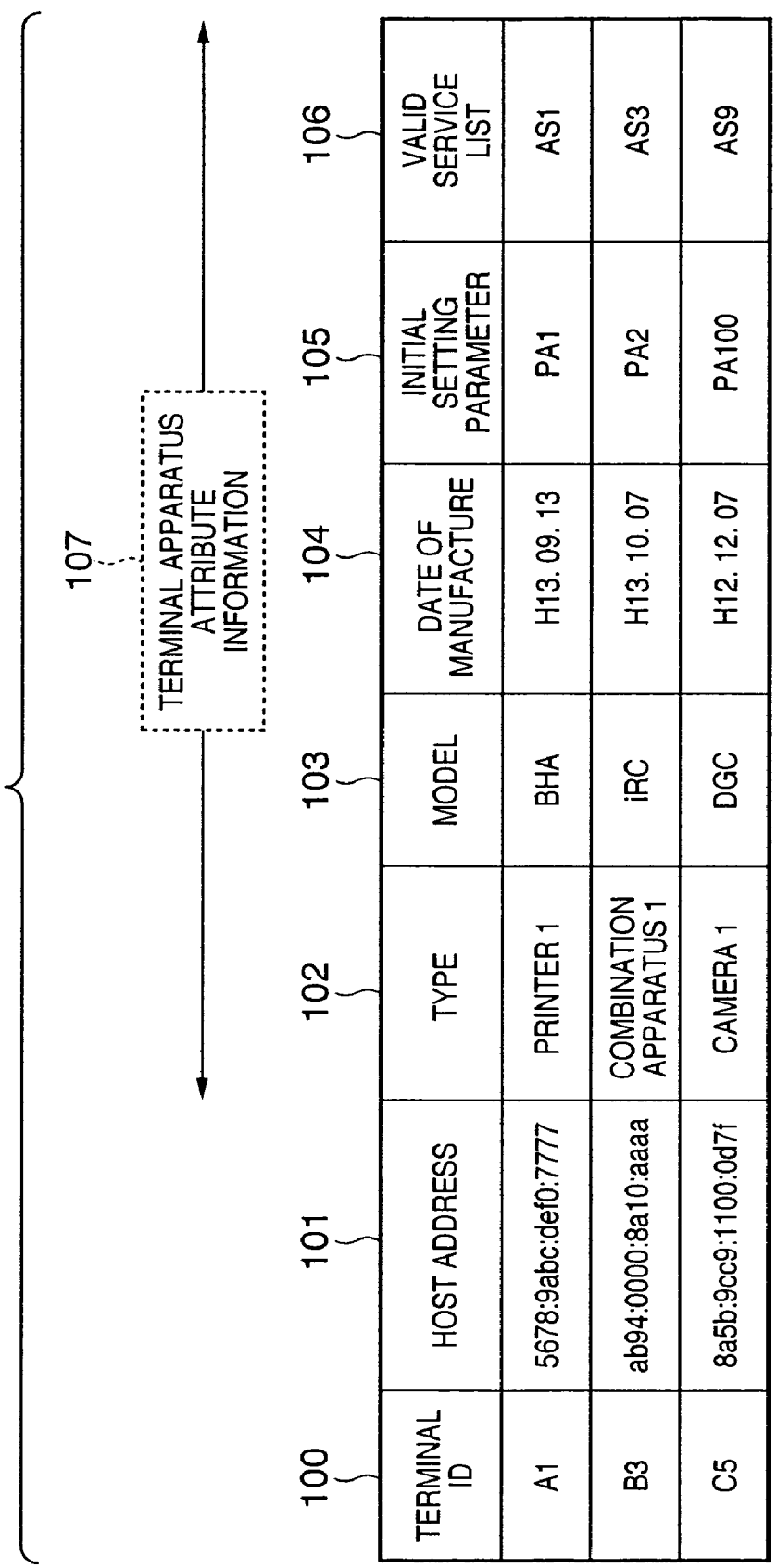
FIG. 7 is a diagram of a terminal apparatus attribute table.

FIG. 7 shows contents of the terminal apparatus attribute table which is registered in the IPv6 host address list by terminal 8 of the terminal service management server 7 by the IP packet for terminal registration. Reference numeral 100 denotes a terminal apparatus ID, which is an identification ID for a terminal apparatus manufacturer to identify a terminal apparatus. Reference numeral 101 denotes an IPv6 host address, which is automatically generated from a MAC address of the terminal apparatus. Terminal apparatus attribute information 107 relating to this includes a type 102, a model 103, a date of manufacture 104, and an initial setting parameter 105 as well as an application service list 106 of application services which the terminal apparatus can use.

[Terminal Service Registration Protocol by Customer]

The shipped IPv6 compatible terminal apparatus 1A is delivered to a terminal apparatus shop under direct management of or relating to the terminal apparatus manufacturer, and sold. The shop has the sales management site 16, which notifies the terminal service provision site 6 of sales achievement, customer information, and the like of the terminal apparatus via the Internet 100.

Figure 8:
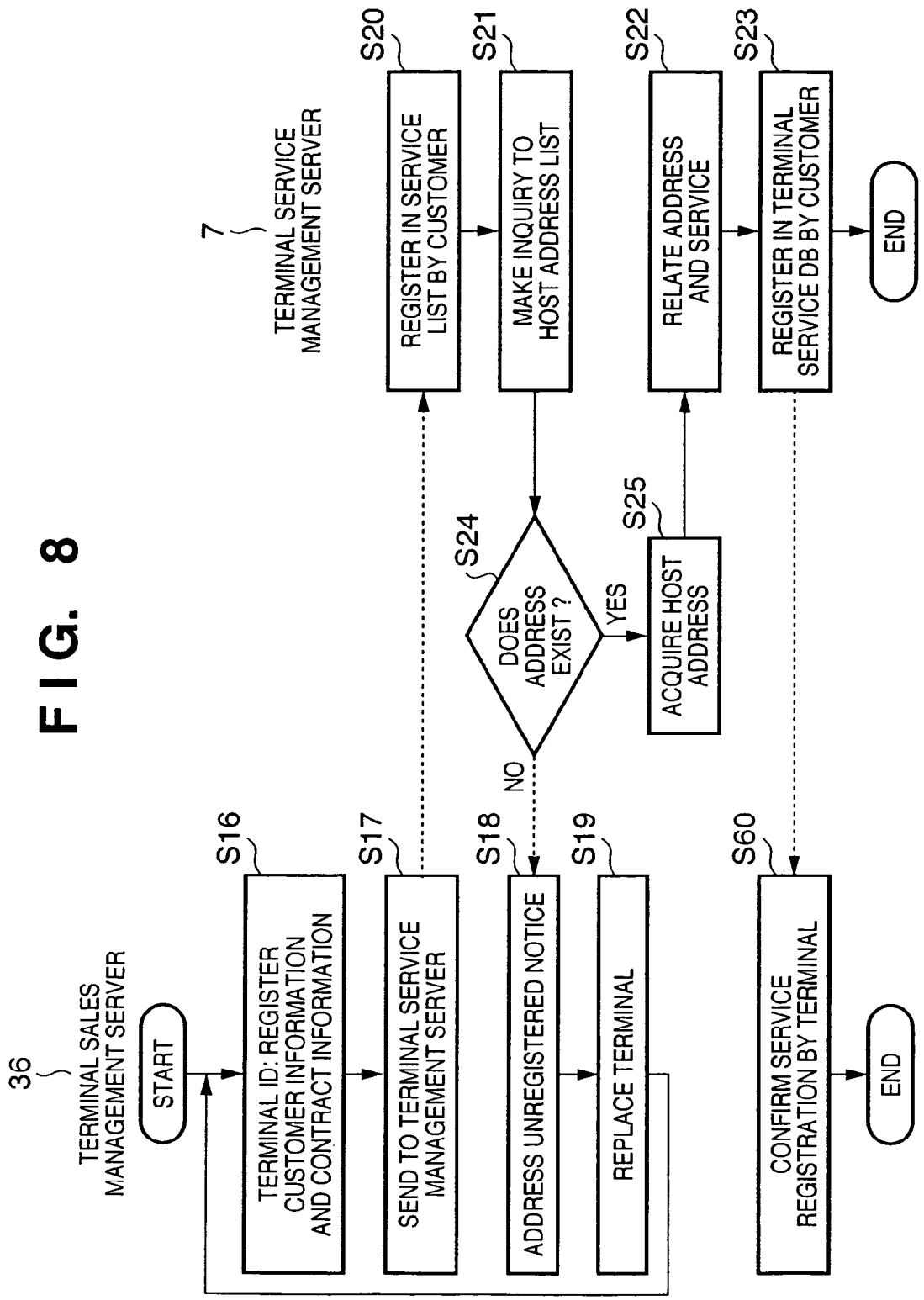
FIG. 8 is a flowchart of terminal service registration by customer from a sales management site 16.

FIG. 8 is a flowchart of registration of terminal service by customer (customer information, contents of a service agreement) in the terminal service management site 6 from the terminal sales management server 36 in the sales management site 16.

In the shop, at a stage when the IPv6 compatible terminal apparatus 1 (1A) is sold to a customer, in S16, a terminal sales achievement table by customer is prepared from the client terminal 19 of FIG. 1 based upon sales information and is notified to the terminal sales management server 36.

FIG. 9 shows the terminal sales achievement table by customer. Reference numeral 108 denotes a sales terminal name, for example, a model of the terminal apparatus. Reference numeral 109 denotes an identifier for the terminal apparatus manufacturer identifying respective terminal apparatuses according to the terminal apparatus ID. The sales terminal name 108 and the terminal apparatus ID 109 are printed on a box of the IPv6 compatible terminal apparatus 1. The sales terminal name 108 and the terminal apparatus ID 109 are terminal information.

In addition, reference numeral 110 denotes a name of a company/organization to which a customer who purchased the terminal apparatus belongs. Reference numeral 111 denotes a name of ISP (Internet Service Provider (ISP) providing an internet connection service in the case in which the IPv6 compatible terminal apparatus 1 is connected to the Internet 100 and used, and in the case of FIG. 1, a name of the ISP 30) to which the customer belongs, which is used by the customer. Reference numeral 112 denotes a customer address; 113, an Email address of the customer; and 114, a domain name of a network in which the terminal apparatus is set. Reference numerals 110, 111, 112, 113, and 114 denote customer information. The name of customer's company/organization 110, the name of ISP to which the customer belongs 111, and the domain name 114 are used at the time of network address retrieval described next. Reference numeral 115 denotes a date and time when the terminal apparatus is sold.

Reference Numeral 116 denotes a licensed service list of services licensed to the customer at the time of terminal sales; 117 denotes a licensed application list of applications licensed to the customer. The licensed service list 116 and the licensed application list 117 are contents of the service agreement. In addition, the contents of the service agreement include a term of validity of services, although not shown in FIG. 9.

The terminal sales achievement table by customer including the inputted terminal information, customer information, and contents of the service agreement is sent to the terminal sales management server 36 from the client terminal 19.

The terminal sales management server 36 stores the terminal sales achievement table by customer in the terminal database by customer 17 as a table associated with the terminal information, the customer information, and the contents of the service agreement which were inputted from the client terminal 19 earlier.

The terminal sales achievement table by customer (including customer information) registered in the terminal database by customer 17 is sent to the terminal service management site 6 from the terminal sales management server 36 via the Internet 100 in S17 (12 of FIG. 1). The terminal service management server 7 of the terminal service provision site 6 registers the terminal sales information by customer (including customer information) of the received terminal sales table by customer in the service list by customer 9 in S20. Note that an address of the terminal service provision site 6 is registered in the terminal sales management server 36 in advance.

As described above, the CPU 302 receives the customer information, which is obtained at the time of sales of the IPv6 compatible terminal apparatus 1A which is a communication apparatus having a communication function via a network, through the network interface 305 and stores the customer information in the service list by customer 9.

Next, the terminal service management server 7 extracts a terminal apparatus ID from the service list by customer 9 and, in S21, and inquires if an IPv6 host address of a corresponding terminal apparatus exists in the terminal apparatus attribute table (FIG. 7) which was sent from the terminal manufacturing management server 3 earlier and registered in the IPv6 host address list by terminal 8. In S24, if a host address associated with the terminal apparatus ID is registered, the terminal service management server 7 acquires the IPv6 host address from the IPv6 host address list by terminal 8 in S25.

Then, in S22, the terminal service management server 7 prepares a terminal service attribute table by customer in which the IPv6 host address, and the services 116 and the applications 117, which are licensed at the time of sale of the terminal apparatus having this terminal apparatus ID, are associated with each other with the terminal apparatus ID as a key. In S23, the terminal service management server 7 registers the prepared terminal service attribute table by customer in the terminal service database by customer 14, and notifies the terminal sales management server 36 that the terminal service attribute table by customer has been successfully registered. Here, licensed services to be registered in the terminal service database by customer 14 are services included in both the licensed services listed in the valid service list 106 and the service list by customer 10 which are included in the IPv6 host address list by terminal 8. As described later, a network address corresponding to the terminal apparatus ID is also stored in the terminal service database by customer 14. In S60, the terminal sales management server 36 causes the client terminal 19 to perform display for confirming that a service by terminal has been registered.

In addition, in S24, if a host address associated with the terminal apparatus ID is not registered, the terminal service management server 7 notifies the terminal sales management server 36 to that effect. In S18, the terminal sales management server 36 notifies the client terminal 19 that the host address has not been registered yet. In this case, in the shop, in S19, the terminal is replaced, and the terminal sales achievement table by customer is prepared again.

[Network Address Retrieval Processing]

The terminal service management server 7 also acquires information of a name of an Internet service provider (hereinafter abbreviated as ISP) which provides an Internet connection service in the case in which the IPv6 compatible terminal apparatus 1 is connected to the Internet 100 and used, a domain name, a name of customer's organization, and a name of customer's company from the terminal sales information by customer on the terminal sales table by customer (FIG. 9) of the service list by customer 9.

The terminal service provision site 6 sends an inquiry to the network address retrieval site 20 in order to acquire a network address of a network, to which the terminal apparatus is connected, according to any one of the ISP name, the name of customer's organization, and the name of customer's company.

Note that the NWA (network address) retrieval server 21 refers to the /48 prefix database 22 to specify a network address (higher-order 48 bits) of a network, to which the IPv6 compatible terminal apparatus 1 is connected, according to information of any one of the ISP name, the name of customer's organization, and the name of customer's company from the terminal service provision site 6, and sends a reply to the terminal service provision site 6 (I3 of FIG. 1).

The terminal service management server 7 of the terminal service provision site 6 having received a network address corresponding to the ISP name inquires a subnetwork address (16 bits) of the LAN 29, to which the IPv6 compatible terminal apparatus 1 is connected, from the ISP 30 providing an Internet connection service from the local area network (hereinafter abbreviated as LAN) 29, to which the IPv6 compatible terminal apparatus 1 is connected, according to the information (the name of customer's organization/company 110) of the customer who purchased the IPv6 compatible terminal apparatus 1, and acquires this subnetwork address from the ISP 30 (I4 of FIG. 1).

In addition, the case in which a network address is obtained according to the domain name, the terminal service management server 7 obtains a network address from the DNS server 15.

As described above, the CPU 302 performs communication for acquiring a network address of the network 29 of the customer with the network address retrieval site 20 (or the DNS server 15) and the ISP 30 through the network interface 305 based upon the customer information, which is obtained at the time of sales of the IPv6 compatible terminal apparatus 1A serving as a communication apparatus having a communication function via a network. Then, the CPU 302 receives the network address of the network 29 of the customer (i.e., the network address of the IPv6 compatible terminal apparatus 1 at the time when the IPv6 compatible terminal apparatus 1 is connected to the network 29) from the network address retrieval site 20 (or the DNS server 15) and the ISP 30, and stores the network address in the network address list by customer 10.

Figure 10:
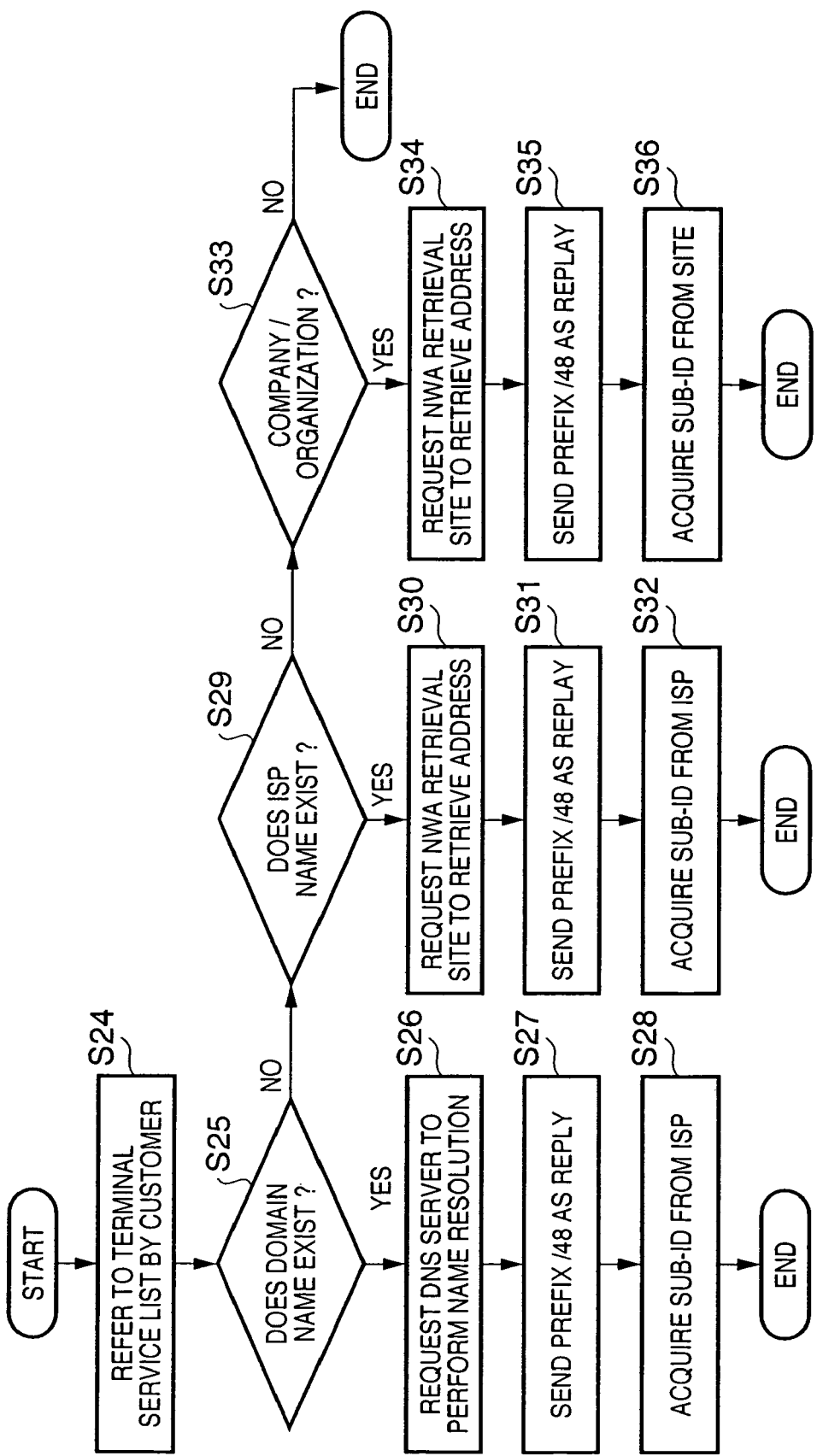
FIG. 10 is a flowchart of network address retrieval processing in a terminal service management server 7.

FIG. 10 is a flowchart of network address retrieval processing in the terminal service management server 7.

The terminal service management server 7 specify a network address according to information of any one of the domain name, the ISP name, the name of customer's organization/company registered in the service list by customer 9. The terminal sales achievement table by customer (FIG. 9) is registered in the service list by customer 9.

In S24, the terminal service management server 7 refers to the service list by customer 9 and, in S25, first judges whether or not the domain name exists. If the domain name exists, in S26, the terminal service management server 7 requests the DNS server 15 existing in the terminal service provision site 6 to perform name resolution processing for specifying an IP address from a domain name and, in S27, obtains higher-order 48 bits of the network address. An ISP can be specified in the network section of the higher-order 48 bits. An address of the DNS server 15 is registered in the RAM 303. Note that the DNS server 15 may be provided on the Internet 100 outside the terminal service provision site 6.

Next, in S28, the terminal service management server 7 sends the name of customer's organization/company 110 to the specified ISP 30 to inquire an address of a subnetwork, to which the IPv6 compatible terminal apparatus 1 is connected, from the ISP 30 and obtain an SUB-ID (16 bits). All 64 bits of the network address are specified by this processing. Higher-order 48 bits of an address in an inquiry destination of the address of this subnetwork represent the network address obtained in S27, and lower-order 80 bits represent a default value (e.g., 0).

A server (e.g., the gateway server 25) in the ISP 30, which has received the inquiry from the terminal service management server 7, specifies a network address of the LAN 29 to which the IPv6 compatible terminal apparatus 1, for which the network address retrieval request was made, according to the customer database 27 and the SLA-ID database 28, and sends a reply to the terminal service provision site 6.

If the domain name does not exist in the terminal service list by customer 9 in S25, the terminal service management server 7 judges whether or not the ISP name exist in the terminal service list by customer 9 in S29. If the ISP name exists, in S30, the terminal service management server 7 requests the network address retrieval site 20 existing on the Internet 100 to retrieve a network address from the ISP name. An address of the network address retrieval site 20 is registered in the removable disk 312. In S31, the network address retrieval site 20 retrieves higher-order 48 bits of the network address from the given ISP name, and sends the higher-order 48 bits as a reply. The network address of the ISP is clarified according to the network section of the higher-order 48 bits.

Next, in S32, the terminal service management server 7 sends the name of customer's organization/company 110 to the specified ISP 30, inquires an address of a subnetwork, to which this terminal is connected, from the ISP 30, and acquires a SUB-ID (16 bits). All 64 bits of the network address are specified by this processing. Higher-order 48 bits of an address of an inquiry destination of the address of this subnetwork represent the network address obtained in S31, and lower-order 80 bits represent a default value (e.g., 0).

If the ISP name does not exist in the terminal service list by customer 9 in S29, the terminal service management server 7 selects a name of customer's organization/company to perform network address retrieval processing in S33. In S34, the terminal service management server 7 requests the network address retrieval site 20 existing on the Internet 100 to retrieve a network address from an attribute name of the name of customer's organization/company. In S35, the network address retrieval site 20 retrieves higher-order 48 bits of the network address from the given attribute name of the name of customer's organization/company, and sends the higher-order 48 bits as a reply. The network address of the attribute name of the name of customer's organization/company is found out according to the network section of the higher-order 48 bits. In this case, the customer has a facility same as that of the Internet service provider 30.

Next, in S36, the terminal service management server 7 sends the terminal apparatus ID 109 to the site of the specified name of customer's organization/company, inquires an address of a subnetwork, to which the terminal is connected, from the site, and acquires a SUB-ID (16 bits). All 64 bits of the network address are specified by this processing. Higher-order 48 bits of an address of an inquiry destination of the address of this subnetwork represent the network address obtained in S35, and lower-order 80 bits represents a default value (e.g. 0).

Although the network address retrieval site 20 is used in order to retrieve a network address in S30 and S34, in another embodiment, the /48 prefix database 22 is provided in the terminal service provision site 6. In the embodiment, a network address which could not be retrieved in the /48 prefix database 22 in the terminal service provision site 6 may be retrieved using the network address retrieval site 20.

In the Internet service provider 30 of FIG. 1, information on customers using the Internet connection service through the ISP 30 is stored in the customer database 27. An identification ID of a network for each customer is stored in the SLA-ID database 28. Networks for the respective customer can be specified according to the identification ID.

A server (e.g., the gateway server 25) in the ISP 30 having received an inquiry from the terminal service management server 7 specifies a network address of the LAN 29 to which the IPv6 compatible terminal apparatus 1 is connected, for which the network address retrieval request was sent, according to the customer database 27 and the SLA-ID database 28, and sends the network address to the terminal service provision site 6 as a reply.

The terminal service management server 7 stores this result (i.e., the network address of the LAN 29 to which the IPv6 compatible terminal apparatus 1 is connected) in the network address list by customer 10 of the terminal service provision site 6 in association with the terminal apparatus ID and also stores the result in the terminal service database by customer 14 in association with the terminal apparatus ID.

[Terminal Service Attribute Table by Customer]

The terminal service management server 7 performs registration processing for terminal services by customer (customer information, contents of a service agreement) and network address retrieval processing. Then, the terminal service management server 7 stores a terminal service attribute table by customer, in which all of a terminal apparatus ID, a host address, a network address, a licensed application, and a licensed service are associated with each other, in the terminal service database by customer 14. The terminal apparatus ID, the host address, the network address, the licensed application, and the licensed service are extracted from the IPv6 address list by terminal 8 in which the terminal apparatus ID and the host address are stored in association with each other, the terminal service list by customer 9 in which the terminal apparatus ID and the customer attribute information (licensed application, licensed service, etc.) are stored in association with each other, and the customer network address list 10 in which the network address where this terminal apparatus is installed and used is stored in association with the terminal apparatus ID.

Figure 11:
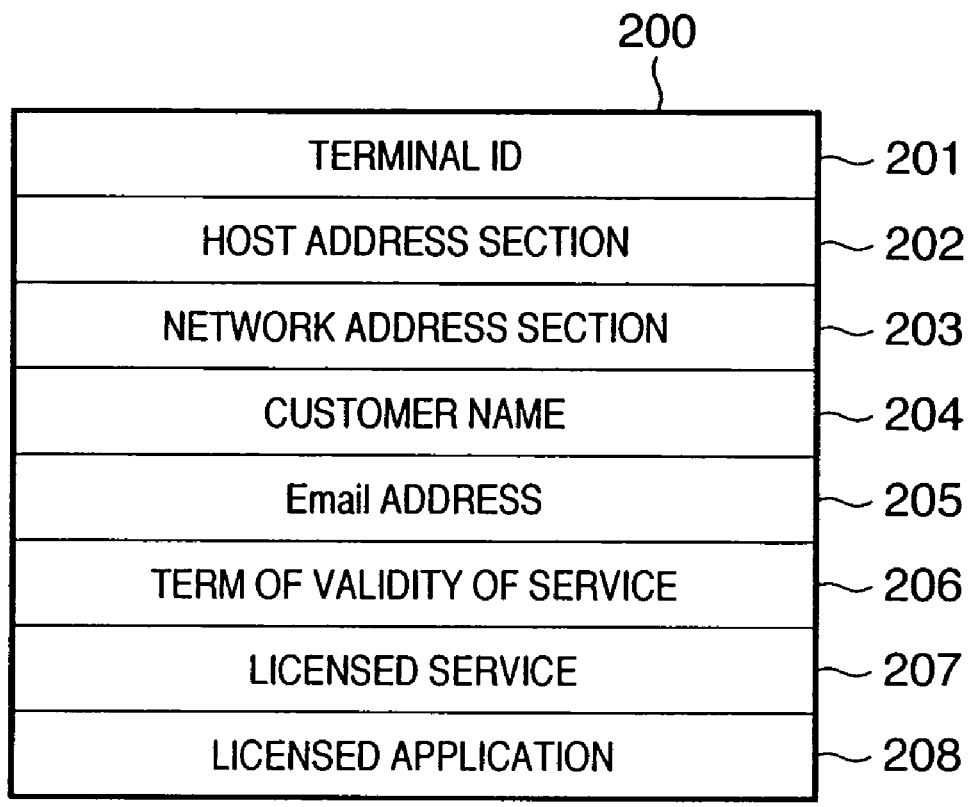
FIG. 11 is a diagram of a terminal service attribute table by customer.

FIG. 11 is a diagram showing a constitution of the terminal service attribute table by customer which is prepared from the information which the terminal service management server 7 has acquired in the IPv6 host address list 8, the service list by customer 9, and the customer network address list 10, respectively. A terminal service attribute table by customer 200 is registered in the terminal service database by customer 14.

Reference numeral 201 denotes an ID identifying a terminal manufactured by a terminal apparatus manufacturer, which is a serial number or the like. The terminal apparatus ID 201 is notified to the terminal service management site 6 from the terminal manufacturing management server 3 at the time of terminal apparatus manufacturing (before shipment), and is notified to the terminal service management site 6 from the terminal sales management server 36 at the time of terminal apparatus sales (after shipment). The terminal apparatus ID 201 notified from the terminal manufacturing management server 3 and the terminal apparatus ID 201 notified from the terminal sales management server 36 are identical.

Reference numeral 202 denotes an IPv6 host address of a terminal apparatus, which is extracted from the IPv6 host address list by terminal 8. Reference numeral 203 denotes an IPv6 network address, which is extracted from the network address list by customer 10.

Reference numeral 204 denotes a customer name (name of customer's organization/company); 205, an Email address of the customer; 206, a term of validity of service; 207, a licensed service (contents of an available service licensed to the customer at the time of purchasing the terminal apparatus); and 208, a licensed application (contents of available application software licensed to the customer at the time of purchasing the terminal apparatus). The customer name 204, the Email address 205, the term of validity of service 206, the licensed service 207, and the licensed application 208 are extracted from the service list by customer 9.

[Use Registration and Service Provision Protocol]

FIG. 12 is a protocol diagram showing procedures for terminal use registration and service provision between the customer site (LAN 29) and the terminal service management site 6.

Note that the network interface 305 of the terminal service management server 7 has an IPv6 address detection function, extracts an IPv6 packet accessed from a terminal apparatus to the terminal service management server 7, and extracts an IPv6 global IP address of a sender from a header section thereof.

The IPv6 compatible terminal apparatus 1, which is sold to the customer from a shop, first extracts an MAC address attached to the network interface 305 of the IPv6 compatible terminal apparatus 1 in S37 when it is connected to the LAN 29 which the customer is using. In S38, the IPv6 compatible terminal apparatus 1 generate an IPv6 host address identifying a terminal apparatus according to the processing for automatically generating an IPv6 host address described before from this MAC address.

Then, as described below, the IPv6 compatible terminal apparatus 1 determines a global IP address according to proximity retrieval.

That is, in S39, the IPv6 compatible terminal apparatus 1, for which the host address was generated, sets "fe80::" which is a network ID indicating a link local address in a network section, and automatically generates the link local address. In RS (Router Solicitation) transmission of S40, the IPv6 compatible terminal apparatus 1 inquires a network address from the IPv6 compatible router 34 existing in the identical link. In S41, the IPv6 compatible router 34 having received this inquiry sends an RA (Router Advertisement) to the IPv6 compatible terminal apparatus 1, and notifies the IPv6 compatible terminal apparatus 1 of a network address which is an identifier of a network of the LAN 29.

A global IP address (unicast address) of the IPv6 compatible terminal apparatus 1 is determined in S42 from the notified network address and the host address automatically generated earlier, and the global IP address is notified to the IPv6 compatible router 34. In response to this, the IPv6 compatible router 34 confirms, in address redundancy detection of S43, that other IPv6 compatible terminal apparatuses having an IPv6 global IP address with the identical identification ID in the same link (LAN 29), and sends an approval notice of license to the IPv6 compatible terminal apparatus 1.

The IPv6 compatible terminal apparatus 1, for which the global IP address has been determined and the license has been notified, changes into an initial setting mode in S44 and brings its state into a state in which installation of an application is possible. Then, in a connection request to the management server 7 of S45, the IPv6 compatible terminal apparatus 1 sends an IP packet for device authentication in order to notify its own global IP address to the terminal service management server 3 (I5 of FIG. 1). An address of the terminal service management server 3 is registered in the ROM 218.

Note that the address redundancy detection is not limited to the procedures of S42 and S43.

In S46, the terminal service management server 7, which has received the IP packet for device authentication sent from the IPv6 compatible terminal apparatus 1, uses the network interface 305 to acquire the global IP address of the IPv6 compatible terminal apparatus 1, which is a sender, from a starting point address field of the IPv6 header 300 of the arrived IP packet. The terminal service management server 7 refers to the terminal service database by customer 14 (FIG. 11) from the acquired global IP address (network address and host address) to specify a terminal apparatus ID. In S47, the terminal service management server 7 authenticates the IPv6 compatible terminal apparatus 1 as a device, for which the service of the terminal service management server 7 can be used, according to the specified terminal apparatus ID, and sends a notice of service license to the IPv6 compatible terminal apparatus 1.

As described above, the CPU 302 authenticates the IPv6 compatible terminal apparatus 1 serving as a communication apparatus having a communication function via a network, which has sent the IP packet for authentication, based upon the host address of the IPv6 compatible terminal apparatus 1 received from the terminal manufacturing factory site 5, the network address of the IPv6 compatible terminal apparatus 1 received from the network address retrieval site 20 (or the DNS server 15) and the internet service provider 30, and the IP packet for device authentication received from the IPv6 compatible terminal apparatus 1 of the customer site (LAN 29).

Note that, in a certain embodiment, when the IPv6 compatible terminal apparatus 1 sends the IPv6 packet for device authentication to the terminal service management server 7, the IPv6 compatible terminal apparatus 1 stores, for example, an identification ID (which may be a serial number or a password) of the terminal in the payload section, and the terminal service management server 7 performs authentication using both of the IPv6 address and another authentication ID of the payload section.

In response to this, in the installation approval of S47, the IPv6 compatible terminal apparatus 1 performs preparation processing for installation of an application and approval of a customer. An approval screen of a setting request for a licensed service and a licensed application is outputted on a user interface (CRT 225) of the IPv6 compatible terminal apparatus 1, and a customer using the licensed service and the licensed application is caused to make connection to the terminal service management server 7 to approve an initial setting, download various licensed services and licensed applications, and execution of setup. If the customer does not approve them, the setup is stopped, and the customer cannot receive provision of a service from the terminal service management server 7.

According to the installation approval processing by the customer using the input device 226 of S47, the IPv6 compatible terminal apparatus 1 notifies the terminal service management server 7 of a request to start installation. In S48, the terminal service management server 7 retrieves a service module, which the IPv6 compatible terminal apparatus 1 can use, from the terminal service database by customer 14 based upon the terminal apparatus ID of the IPv6 compatible terminal apparatus 1 specified from the global IP address of the IPv6 compatible terminal apparatus 1. In S49, the terminal service database by customer 14 retrieves a service module which the IPv6 compatible terminal apparatus 1 can use, extracts a service module (program) for initial setting information, an application, and a service licensed in this table from the zero configuration module 12 or the service module 13, and sends the service module to the terminal service management server 7. In S50, the terminal service management server 7 sends this service module to the IPv6 compatible terminal apparatus 1 in the LAN 29 from the Internet 100 via the ISP 29 (16 of FIG. 1).

As described above, the CPU 302 authenticates the IPv6 compatible terminal apparatus 1 serving as a communication apparatus having a communication function via a network, which has sent the IP packet for authentication, based upon the host address of the IPv6 compatible terminal apparatus 1 received from the terminal manufacturing factory site 5, the network address of the IPv6 compatible terminal apparatus 1 received from the network address retrieval site 20 (or the DNS server 15) and the internet service provider 30, and the IP packet for device authentication.

At a stage when installation of the received service module ends, in S51, the IPv6 compatible terminal apparatus 1 notifies the terminal service management server 7 of the completion of the installation. In S52, the terminal service management server 7 registers in the terminal service database 14 by customer 14 to the effect that provision of the service module to the IPv6 compatible terminal apparatus 1 has ended.

[Other Embodiments]

In a second embodiment, the terminal service provision site 6 is provided in the terminal manufacturing factory site 5. In this embodiment, the IP packet for terminal registration from the IPv6 compatible terminal apparatus 1A (or the terminal manufacturing management server 3) to the terminal service management server 7 is sent via a LAN in the terminal manufacturing factory site 5.

In addition, in a third embodiment, the terminal service provision site 6 is provided in the sales management site 16. In this embodiment, registration of customer information in the terminal service management server from the terminal sales management server 36 (or the client terminal 19) is performed via a LAN in the sales management site 16.

In addition, in a fourth embodiment, the terminal service provision site 6 is provided in the Internet service provider 30. In this embodiment, a network address of an IP address of a terminal connected to the LAN 29 is specified from the customer database 27 and the SLA-ID database 28 connected to a network in the Internet service provider 30.

The present invention has been described based upon the preferred embodiments. However, the present invention is not limited to the constitutions of the above-described embodiments but can be modified in various ways within the scope of claims.

What is claimed is:

1. A service provision method, comprising:
   acquiring before shipment of a terminal apparatus a host address of the terminal apparatus included in a first signal as a sending side address transmitted from the terminal apparatus connected to a first network, wherein, in acquiring the host address of the terminal apparatus before shipment of the terminal apparatus, the host address of the terminal apparatus connected to the first network in an apparatus factory is acquired;
   acquiring owner information of the terminal apparatus;
   acquiring a network address of a second network in accordance with the acquired owner information from a database storing the network address of the second network and the owner information of the terminal apparatus;
   acquiring after shipment of the terminal apparatus, when a second signal is transmitted from the terminal apparatus connected to the second network, an IPv6 address of a sending side included in the second signal transmitted from the terminal apparatus;

determining the host address of the terminal apparatus acquired before shipment of the terminal apparatus to coincide with lower-order 64 bits of the IPv6 address acquired from the transmitted second signal and the network address of the second network acquired from the database in accordance with the acquired owner information to coincide with higher-order 64 bits of the IPv6 address acquired from the transmitted second signal; and providing a service, via the Internet, to the terminal apparatus via the second network.

2. The service provision method according to claim 1, wherein, in acquiring the network address of the second network, a part of the network address of the second network is acquired from an Internet service provider for connecting the second network to the Internet.

3. The service provision method according to claim 1, wherein, in acquiring the network address of the second network, a part of the network address of the second network is acquired from a DNS server.

4. A service provision apparatus, comprising:

a processor configured to:

acquire before shipment of a terminal apparatus a host address of the terminal apparatus included in a first signal as a sending side address transmitted from the terminal apparatus connected to a first network, wherein, in acquiring the host address of the terminal apparatus before shipment of the terminal apparatus, the host address of the terminal apparatus connected to the first network in an apparatus factory is acquired;

acquire owner information of the terminal apparatus;

acquire a network address of a second network in accordance with the acquired owner information from a database storing the network address of the second network and the owner information of the terminal apparatus;

acquire after shipment of the terminal apparatus, when a second signal is transmitted from the terminal apparatus connected to the second network, an IPv6 address of a sending side included in the second signal transmitted from the terminal apparatus;

determine the host address of the terminal apparatus acquired before shipment of the terminal apparatus to coincide with lower-order 64 bits of the IPv6 address acquired from the transmitted second signal and the network address of the second network acquired from the database in accordance with the acquired owner information to coincide with higher-order 64 bits of the IPv6 address acquired from the transmitted second signal; and provide a service, via the Internet, to the terminal apparatus via the second network.

* * * * *